US008453081B2

(12) United States Patent
Cases et al.

(10) Patent No.: US 8,453,081 B2
(45) Date of Patent: May 28, 2013

(54) ELECTRICAL DESIGN SPACE EXPLORATION

(75) Inventors: Moises Cases, Austin, TX (US); Jinwoo Choi, Austin, TX (US); Bhyrav M. Mutnury, Austin, TX (US); Caleb J. Wesley, Winston Salem, NC (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 12/784,150

(22) Filed: May 20, 2010

(65) Prior Publication Data

US 2011/0289463 A1    Nov. 24, 2011

(51) Int. Cl.
  *G06F 17/50*    (2006.01)
(52) U.S. Cl.
  USPC ........... 716/106; 716/111; 716/132; 716/135; 703/13; 703/14
(58) Field of Classification Search
  USPC ............... 716/106–111, 132–136; 703/13–20
  See application file for complete search history.

(56) References Cited

U.S. PATENT DOCUMENTS

| | | | |
|---|---|---|---|
| 6,154,801 A | 11/2000 | Lowe et al. | |
| 6,216,252 B1 | 4/2001 | Dangelo et al. | |
| 6,298,452 B1 | 10/2001 | Hill | |
| 6,470,482 B1 | 10/2002 | Rostoker et al. | |
| 6,845,491 B2 | 1/2005 | Miller et al. | |
| 7,072,814 B1 * | 7/2006 | Stoica | 703/13 |
| 7,085,702 B1 | 8/2006 | Hwang et al. | |
| 7,130,783 B1 | 10/2006 | Harer et al. | |
| 2004/0010401 A1 | 1/2004 | Davis et al. | |
| 2004/0064296 A1 | 4/2004 | Saxena et al. | |
| 2008/0028353 A1 * | 1/2008 | Lu et al. | 716/13 |
| 2009/0228846 A1 * | 9/2009 | McConaghy et al. | 716/4 |
| 2009/0249263 A1 * | 10/2009 | Arimoto | 716/2 |

FOREIGN PATENT DOCUMENTS

| | | |
|---|---|---|
| JP | 2006285860 | 10/2006 |
| WO | WO-2004114166 | 12/2004 |

OTHER PUBLICATIONS

Abramson, Mark A., "NOMADm Optimization Software", http://www.gerad.ca/NOMAD/Abramson/nomadm.html (Obtained from the Internet on Nov. 2, 2009) Apr. 2, 2009, 7 pages.

(Continued)

*Primary Examiner* — Paul Dinh
(74) *Attorney, Agent, or Firm* — DeLizio Gilliam, PLLC

(57) ABSTRACT

A method for electrical design space exploration includes receiving a template for an electrical design. Design component parameters associated with at least one component in the electrical design are also received. Weighted factors are assigned to design complexity parameters of the electrical design. The parameters of the complexity can include at least one of following: whether the electrical design is known, a number of the design component parameters, a level of interaction among the design component parameters, a time constraint and a memory restriction of a simulation, and whether a statistical analysis or a worst case approach is used to analyze an output of the simulation. A simulation approach for design space exploration of the electrical design is selected based on the weighted factors for the parameters of the complexity of the electrical design. The simulation is performed based on the selected simulation approach.

24 Claims, 5 Drawing Sheets

OTHER PUBLICATIONS

Beyene, Wendem T., "Application of Artificial Neural Networks to Statistical Analysis and Nonlinear Modeling of High-Speed Interconnect Systems", *IEEE Transactions on Computer-Aided Design of Integrated Circuits and Systems*, vol. 26, Issue 1 http://ieeexplore.ieee.org/stamp/stamp.jsp?tp=&arnumber=4039499&isnumber=4039497 (Obtained from the Internet on Jan. 6, 2010) Jan. 2007, pp. 166-176.

Beyene, Wendem T., "Statistical and Sensitivity Analysis of Voltage and Timing Budgets of Multi-Gigabit", *DesignCon* 2005.

Cong, Jason et al., "Dynamic weighting Monte Carlo for constrained floorplan designs in mixed signal applications", *Proceedings of 2000 Design Automation Conference (DAC)* http://www.people.fas.harvard.edu/~junliu/TechRept/00folder/cong&etal.pdf (Obtained from the Internet on Oct. 27, 2009) Jan. 2000, 6 pages.

Goh, Chi Keong et al., "Evolving the Tradeoffs between Pareto-Optimality and Robustness in Multi-Objective Evolutionary Algorithms", *Book Chapter, Evolutionary Computation in Dynamic and Uncertain Environments* Apr. 3, 2007.

Guo, Dong et al., "Quasi-Monte Carlo filtering in nonlinear dynamic systems", *IEEE Transactions on Signal Processing*, vol. 54, Issue 6, Part 1.http://ieeexplore.ieee.org/stamp/stamp.jsp?tp=&arnumber=1634806&isnumber=34283 (Obtained from the Internet on Jan. 6, 2010) Jun. 2006, pp. 2087-2098.

Jagarkal, Sudhakar G. et al., "Design optimization and reliability of PWB level electronic package", *The 9th Intersociety Conference on Thermal and Thermomechanical Phenomena in Electronic Systems*, vol. 2 http://ieeexplore.ieee.org/stamp/stamp.jsp?tp=&arnumber=1318306&isnumber=29212 (Obtained from the Internet on Jan. 6, 2010) Jun. 2004, pp. 368-376.

Lai, Yi-Shao et al., "Optimization of Thermomechanical Reliability of Board-level Package-on-Package Stacking Assembly", *IEEE Transactions on Components and Packaging Technologies*, vol. 29, Issue 4 http://ieeexplore.ieee.org/stamp/stamp.jsp?tp=&arnumber=4016227&isnumber=4016207 (Obtained from the Internet on Jan. 6, 2010) Dec. 2006, pp. 864-868.

Le Digabel, Sebastien A., "Nomad user guide version 3.2", http://www.gerad.ca/NOMAD/Downloads/user_guide.pdf (Obtained from the Internet on Oct. 27, 2009) Jul. 8, 2009, pp. 1-45.

Li, Yi et al., "Controller Design of Networked Control System Based on Gasa—Abstract", *Journal of System Simulation*, vol. 16, No. 7 (full text of the publication is not available) 2004.

Lu, Xiuzhen et al., "Reliability analysis of embedded chip technique with design of experiment methods", *International Symposium on Electronics Materials and Packaging* http://ieeexplore.ieee.org/stamp/stamp.jsp?tp=&arnumber=1598233&isnumber=33617 (Obtained from the Internet on Jan. 6, 2010) Dec. 2005, pp. 43-49.

Nobile, E. et al., "Geometric Parameterization and Multiobjective Shape Optimization of Convective Periodic Channels", *Numerical Heat Transfer, Part B: Fundamentals*, vol. 50, Issue 5 http://pdfserve.informaworld.com/142799_759220352.pdf (Obtained from the Internet on Nov. 2, 2009) Nov. 2006, 425-453.

Pereira, M. V. et al., "Combining analytical models and Monte Carlo techniques in probablistic power system analysis", *IEEE Transactions on Power Systems*, vol. 7, Issue 1 Feb. 1992, pp. 265-272.

Ridge, Enda et al., "Sequential Experiment Designs for Screening and Tuning Parameters of Stochastic Heuristics", *Workshop on Empirical Methods for the Analysis of Algorithms at the Ninth International Conference on Parallel Problem Solving from Nature (PPSN)* http://www.endaridge.org/publications/conferences/EMAA/EMAA2006_RidgeKudenko.pdf (Obtained from the Internet on Nov. 2, 2009) 2006, 12 pages.

Singh, N. et al., "Swarm Intelligence for Electrical Design Space Exploration", *Electrical Performance of Electronic Packaging*, 2007 IEEE, vol., No., pp. 21-24, Oct. 29-31, 2007 URL: http://ieeexplore.ieee.org/stamp/stamp.jsp?tp=&arnumber=4387113&isnumber=4387100 Oct. 2007, pp. 21-24.

Sun, Tsung-Ying et al., "Optimal UAV flight path planning using skeletonization and Particle Swarm Optimizer", *Evolutionary Computation, 2008.CEC 2008. (IEEE World Congress on Computational Intelligence)* http://ieeexplore.ieee.org/stamp/stamp.jsp?tp=&arnumber=4630946&isnumber=4630767 (Obtained from the Internet on Jan. 6, 2010) Jun. 1-6, 2008, 1183-1188.

Wesley, Caleb et al., "Electrical Design Space Exploration for High Speed Servers", *IEEE, Electronic Components and Technology Conference, 2007. ECTC '07. Proceedings. 57th* http://domino.watson.ibm.com/acas/w3www_acas.nsf/images/projects_0607/$FILE/calebWesley.pdf (Obtained from the Internet on Nov. 2, 2009) May 29-Jun. 1, 2007, 7 pages.

Zhan, Bret A., "Steady state thermal characterization and junction temperature estimation of multi-chip module packages using the response surface method", *The 6th Intersociety Conference on Thermal and Thermomechanical Phenomena in Electronic System* May 1998, pp. 76-81.

Zilaro, Patrick et al., "Application of design of experiments methodology to model the effect of multiple parameters on simultaneous switching noise", Proceedings of 52nd Electronic Components and Technology Conference http://ieeexplore.ieee.org/stamp/stamp.jsp?tp=&arnumber=1008076&isnumber=21740 (Obtained from the Internet on Jan. 6, 2010) May 2002, pp. 79-85.

* cited by examiner

300

|    | A | B | C | D | E | Simulation Approach |
|----|---|---|---|---|---|---------------------|
| 1  | 0 | 0 | 0 | 0 | 0 | Genetic |
| 2  | 0 | 0 | 0 | 0 | 1 | Genetic |
| 3  | 0 | 0 | 0 | 1 | 0 | Genetic |
| 4  | 0 | 0 | 0 | 1 | 1 | Genetic |
| 5  | 0 | 0 | 1 | 0 | 0 | Genetic |
| 6  | 0 | 0 | 1 | 0 | 1 | Genetic |
| 7  | 0 | 0 | 1 | 1 | 0 | Genetic |
| 8  | 0 | 1 | 1 | 1 | 1 | Genetic |
| 9  | 0 | 1 | 0 | 0 | 0 | Genetic |
| 10 | 0 | 1 | 0 | 0 | 1 | Genetic |
| 11 | 0 | 1 | 0 | 1 | 0 | Genetic |
| 12 | 0 | 1 | 0 | 1 | 1 | Genetic |
| 13 | 0 | 1 | 1 | 0 | 0 | Genetic |
| 14 | 0 | 1 | 1 | 0 | 1 | Monte Carlo |
| 15 | 0 | 1 | 1 | 1 | 0 | Monte Carlo |
| 16 | 0 | 0 | 1 | 1 | 1 | Monte Carlo |
| 17 | 1 | 0 | 0 | 0 | 0 | Orthogonal Arrays |
| 18 | 1 | 0 | 0 | 0 | 1 | Orthogonal Arrays |
| 19 | 1 | 0 | 0 | 1 | 0 | Orthogonal Arrays |
| 20 | 1 | 0 | 0 | 1 | 1 | Orthogonal Arrays |
| 21 | 1 | 0 | 1 | 0 | 0 | Orthogonal Arrays |
| 22 | 1 | 0 | 1 | 0 | 1 | Orthogonal Arrays |
| 23 | 1 | 0 | 1 | 1 | 0 | Orthogonal Arrays |
| 24 | 1 | 1 | 1 | 1 | 1 | Orthogonal Arrays |
| 25 | 1 | 1 | 0 | 0 | 0 | Orthogonal Arrays |
| 26 | 1 | 1 | 0 | 0 | 1 | Orthogonal Arrays |
| 27 | 1 | 1 | 0 | 1 | 0 | Orthogonal Arrays |
| 28 | 1 | 1 | 0 | 1 | 1 | Orthogonal Arrays |
| 29 | 1 | 1 | 1 | 0 | 0 | Orthogonal Arrays |
| 30 | 1 | 1 | 1 | 0 | 1 | Orthogonal Arrays |
| 31 | 1 | 1 | 1 | 1 | 0 | Orthogonal Arrays |
| 32 | 1 | 1 | 1 | 1 | 1 | Orthogonal Arrays |

FIG. 3

ELECTRICAL DESIGN SPACE EXPLORATION

BACKGROUND

Embodiments of the inventive subject matter generally relate to the field of electrical design, and, more particularly, to electrical design space exploration.

Designing electronic systems can be complex due to a multitude of design parameters. Designers define a design space for a particular design based on a plurality of potential values that can be applied to each of the design parameters. The designers then utilize computer aided simulation and modeling tools to analyze the design space so that an optimal set of values can be chosen for the design parameters. Electrical design and verification have become extremely complex and time consuming as the number of parameters and the frequency of the signals in these electronic systems continue to increase.

SUMMARY

Embodiments include a method for electrical design space exploration. A template for an electrical design is received. Design component parameters associated with at least one component in the electrical design are also received. Weighted factors are assigned to design complexity parameters of the electrical design. In some example embodiments, the parameters of the complexity include at least one of following: whether the electrical design is known, a number of the design component parameters, a level of interaction among the design component parameters, a time constraint and a memory restriction of a simulation, and whether a statistical analysis or a worst case approach is used to analyze an output of the simulation. A simulation approach for design space exploration of the electrical design is selected based on the weighted factors for the parameters of the complexity of the electrical design. The simulation is performed based on the selected simulation approach.

Embodiments include a computer program product for design space exploration that includes a computer readable storage medium having computer readable program code. The computer readable program code is configured to receive a template for an electrical design and design component parameters that are associated with at least one component in the electrical design. The computer readable program code is also configured to assign weighted factors to parameters of a complexity of the electrical design. The parameters of the complexity include a number of the design component parameters and a level of interaction among the design component parameters. The computer readable program code is configured to select a simulation approach for design space exploration of the electrical design based on the weighted factors for the parameters of the complexity of the electrical design. The computer readable program code is configured to perform a simulation based on the selected simulation approach.

Embodiments include a computer program product for design space exploration that includes a computer readable storage medium having computer readable program code. The computer readable program code is configured to receive a template for an electrical design and design component parameters that are associated with at least one component in the electrical design. The computer readable program code is configured to assign weighted factors to parameters of a complexity of the electrical design. The parameters of the complexity include at least one of following: whether the electrical design is known, a number of the design component parameters, a level of interaction among the design component parameters, a time constraint and a memory restriction of a simulation, and whether a statistical analysis or a worst case approach is used to analyze an output of the simulation. The computer readable program code is configured to select a simulation approach for design space exploration of the electrical design based on the weighted factors for the parameters of the complexity of the electrical design. The computer readable program code is also configured to perform the simulation based on the selected simulation approach.

Embodiments include an apparatus having a processor. The apparatus also includes a simulation selection module operable to receive a template for an electrical design and design component parameters that are associated with at least one component in the electrical design. The simulation selection module is operable to assign weighted factors to parameters of a complexity of the electrical design. The parameters of the complexity comprise a number of the design component parameters and a level of interaction among the design component parameters. The simulation selection module is operable to select a simulation approach for design space exploration of the electrical design based on the weighted factors for the parameters of the complexity of the electrical design. The apparatus also includes a simulation module operable to perform a simulation based on the selected simulation approach.

BRIEF DESCRIPTION OF THE DRAWINGS

The present embodiments may be better understood, and numerous objects, features, and advantages made apparent to those skilled in the art by referencing the accompanying drawings.

FIG. 3 is a choice of simulation approach matrix, according to some example embodiments.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to an electrical design, embodiments are not limited to electrical design simulations and can be applied to find solutions to a variety of problems that employ simulations. In other instances, well-known instruction instances, protocols, structures, and techniques have not been shown in detail in order not to obfuscate the description.

Electronic system designs have become extremely complex and time consuming. The electrical design and verification includes design, modeling, simulation and analysis stages of complex electronic structures, wherein the number of environmental and manufacturing variables are continuing to increase. Various approaches can be used for modeling and simulation of electrical designs. A Monte Carlo approach requires a large number of simulations to achieve a meaningful outcome distribution with a high confidence level. Statistical approaches such as orthogonal arrays, design of experiments, central composite design, etc. can require people skilled in the art with a high level of understanding. Consequently, to perform a comprehensive design space exploration, a large amount of manual and tedious effort is required. Example embodiments enable a selection of an approach from among a number of approaches for electrical design space exploration. The different approaches for selection can include the Monte Carlo method, design of experiments, orthogonal array testing, a genetic algorithm technique, swarm intelligence, etc.

In some example embodiments, the selection of an approach is based on various design complexity parameters of the electrical design. The various design complexity parameters represent various factors of complexity of the electrical design. Examples of the different factors of complexity include whether the electrical design is known or unknown, the number of variables in the electrical design, a level of variable interactions required in the electrical design, whether there are time constraints and memory restrictions for the simulation, and whether a statistical analysis or a worst case approach is used on the analysis. Values of the various factors can be assigned to each of the parameters that represent these factors. Some example embodiments can incorporate one, some, or all of the different factors of complexity for the selection of the approach for the electrical design space exploration.

Figure 1:
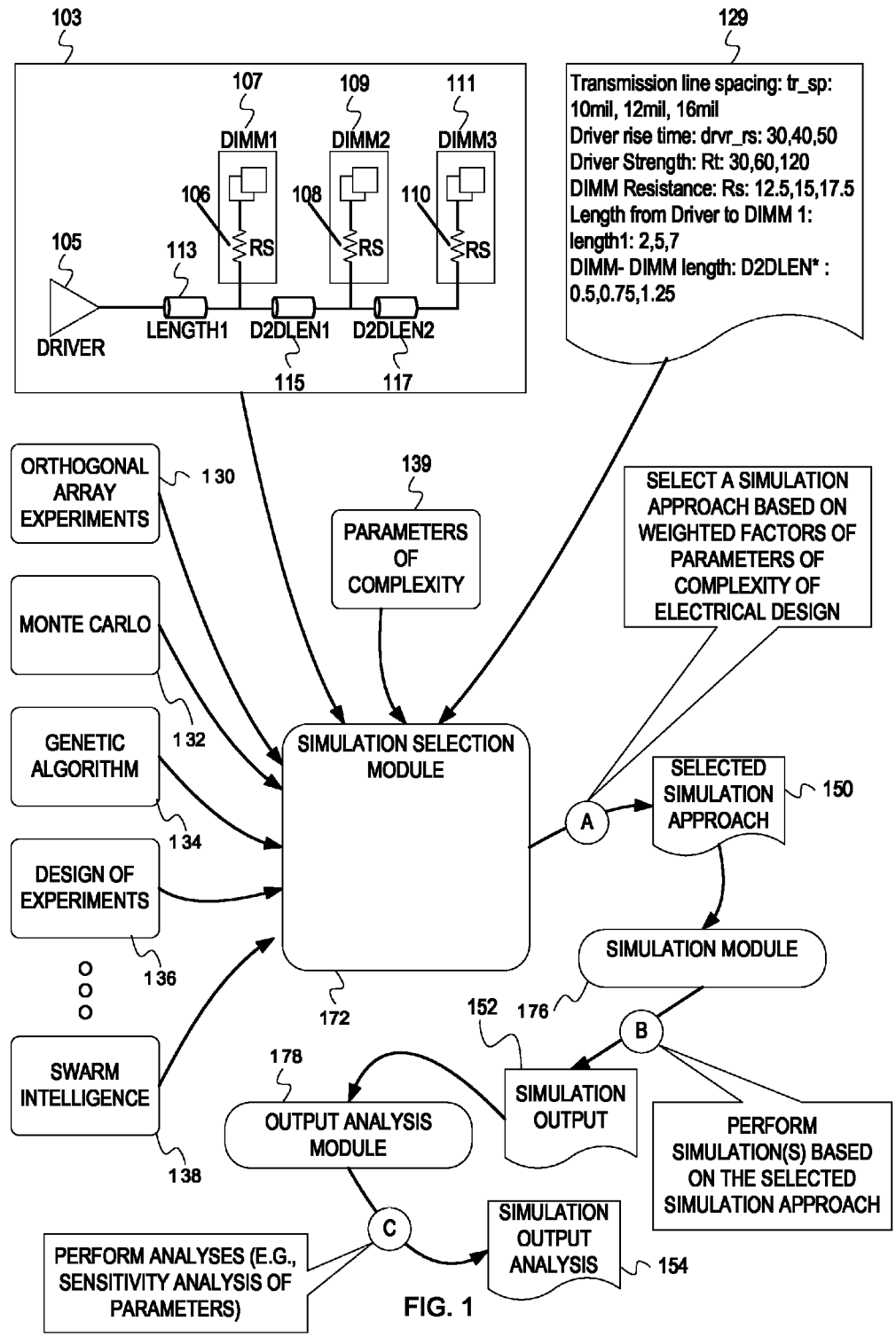
FIG. 1 is conceptual diagram of design space exploration on an electrical design, according to some example embodiments.

FIG. 1 is conceptual diagram of design space exploration on an electrical design, according to some example embodiments. FIG. 1 includes a simulation selection module 172, a simulation module 176 and an output analysis module 178. FIG. 1 also includes an electrical design 103 that comprises a driver 105, receivers (three Dual Inline Memory Modules (DIMMs) 107, 109, and 111) and channels (e.g., transmission lines) for coupling the driver and receivers together. A parameter "length1" 113 represents a length of a transmission line between the driver 105 and the DIMM1 107. A parameter "d2dlen1" 115 represents a length of a transmission line between the DIMM1 107 and the DIMM2 109. A "d2dlen2" 117 represents a length of a transmission line between the DIMM2 109 and the DIMM3 111. Parameters "Rs" 106, 108, and 110 represent the resistances of the DIMM1 107, the DIMM2 109, and the DIMM3 111, respectively. Transmission line spacing is not depicted in the electrical design 103.

FIG. 1 also includes a design space 129 based on possible values for the parameters of the electrical design 103. In this example, the parameters of the electrical design 103 comprise the following: transmission line spacing ("tr_sp"); rise time of the driver 105 ("drvr_rs"); strength of the driver 105 ("rt"); resistance ("rs") 106, 108, 110 of the DIMM1 107, the DIMM2 109, and the DIMM3 111; length1 113, d2dlen1 115, and d2dlen2 117. The potential parameter values 129 comprise three different values for each of the parameters. Values for the "tr_sp" parameter include 10, 12, and 16 milli-inches. Values for the "drvr_rs" parameter include 30, 40, and 50 picoseconds. Values for the "rt" parameter include 30, 60, and 120 ohms. Values for the "rs" 106, 108, 110 parameters include 12.5, 15, and 17.5 ohms. Values for the "length1" 113 parameter include 2, 5, and 7 inches. Values for the "d2dlen1" 115 and the "d2dlen2" 117 parameters include 0.5, 0.75, and 1.25 inches. There can be other design component parameters of the electrical design that are not shown specifically in the design space 129. For example, other design component parameters for the driver 105 and the receivers can include process, temperature and voltage. Other design component parameters for the channel can include its length and impedance.

The simulation selection module 172 receives the electrical design 103 and the design space 129. The simulation selection module 172 also receives design complexity parameters 139 that comprise the parameters of the electrical design complexity that are used in the selection of a simulation approach. The parameters of the electrical design complexity can comprise one or more of the following: 1) whether the electrical design is known or unknown, 2) the number of variables in the electrical design, 3) a level of variable interactions in the electrical design, 4) time constraint and memory restriction of a simulation, and 5) whether statistical analysis or worst case approach is used for analysis. A description of FIG. 3 provides further details regarding these parameters of the electrical design complexity (see below). The simulation selection module 172 selects a simulation approach from a number of simulation approaches. In this example, FIG. 1 includes five different simulation approaches—orthogonal array of experiments 130, Monte Carlo 132, genetic algorithm 134, design of experiments 136 and swarm intelligence 138. In some example embodiments, the simulation selection module 172 can select from lesser or greater number of simulation approaches described herein. Also, the simulation selection module 172 can select the simulation approach based any number of the parameters of the electrical design complexity.

The simulation selection module 172 assigns a weighted factor to each of the design complexity parameters (further described below). The simulation selection module 172 can then use these weighted factors to determine the simulation approach (see stage A). An example of the selection of a simulation approach using the weighted factors is set forth in FIG. 4 (described below). The selected simulation approach is inputted into the simulation module 176. The simulation module 176 performs simulation(s) on the electrical design using the selected simulation approach. The simulation module 176 outputs a simulation output 152 (see stage B). The output analysis module 178 receives the simulation output 152. The output analysis module 178 performs analyses of the simulation output 152, creating simulation output analysis 154 (see stage C). The analyses can include a sensitivity analysis on the design component parameters to determine which parameters are most sensitive to variations and the probability of failure because of variation. The analyses can also include a violations list of those parameters that violate the requirements of the electrical design. For example, the analyses can identify if a temperature, voltage, impedance for a component is beyond a limit defined by the requirements of the electrical design. The analyses can also include a best case and a worst case electrical design based on the design component parameters provided. The output analysis module 178 can generate a representation (e.g., display a graphical depiction, store/transmit a data file, etc.) of a recommended/proposed best design that satisfies specifications. Embodiments can also generate a recommended/proposed best design representation with indications of aspects of the best design that fail to satisfy the specifications and/or a recommended/proposed alternative best design(s) that satisfies the specifications.

Figure 2:
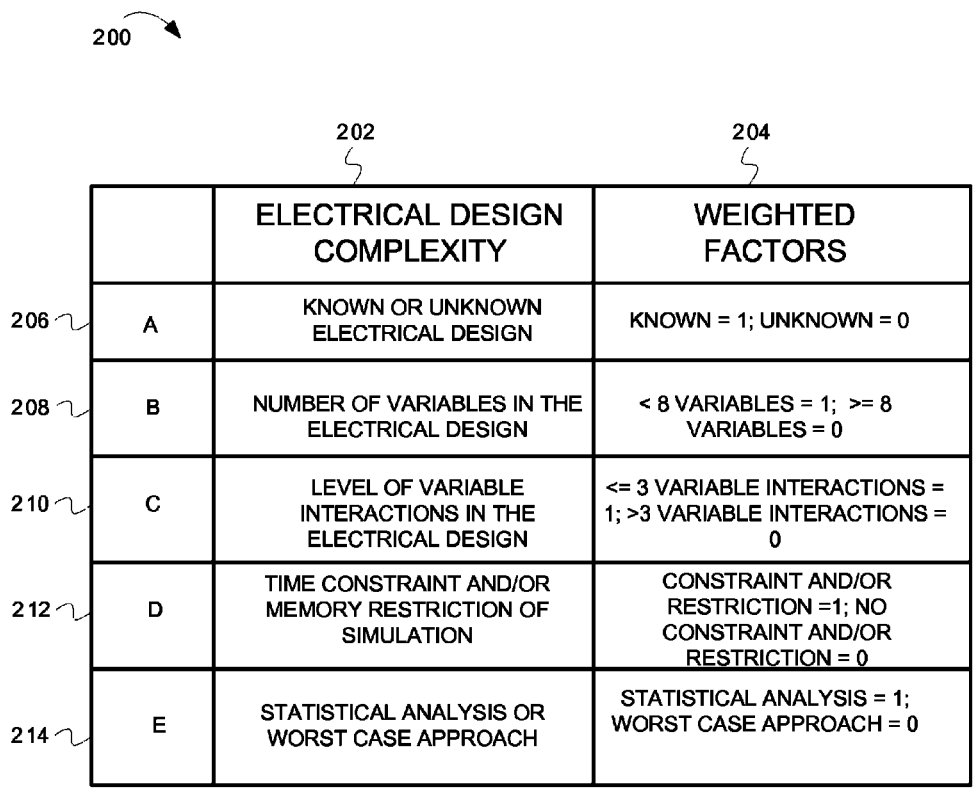
FIG. 2 is a weighted factor matrix for electrical design complexities, according to some example embodiments.

As described above, the simulation selection module 172 selects a simulation approach for an electrical design based on weighted factors associated with one or more complexities of the electrical design. To illustrate, FIG. 2 is a weighted factor matrix for electrical design complexities, according to some example embodiments. A weighted factor matrix 200 includes a column 202 that comprises examples of electrical design complexities. The weighted factor matrix 200 also includes a column 204 that comprises examples of weighted factors associated with each of the electrical design complexities. The weighted factor matrix 200 includes rows 206, 208, 210, 212 and 214. Each of the rows is associated with a weighted factor for an electrical design complexity. Also each of the rows is assigned a letter (A-E) that is referenced in a choice of simulation approach matrix illustrated in FIG. 3 and described below. Rows 206, 208, 210, 212 and 214 are assigned to letters A, B, C, D and E, respectively.

In row 206 (A), an electrical design complexity includes whether the electrical design is known or unknown. In particular, this particular design is considered known if a previous simulation and analysis have been performed. For example, the electrical design can be for a known electrical interface (e.g., Universal Serial Bus (USB) interface) for which simulation and analyses have been performed. If the electrical design is known, the weighted factor is assigned a value of one. If unknown, the weighted factor is assigned a value of zero.

In row 208 (B), an electrical design complexity includes the number of variables in the electrical design. In particular, as the number of variables increase, the complexity increases. As described above, the variables can include channel spacing, channel length, channel impedance, driver rise time, driver strength, receiver resistance, process of the driver and receivers, temperature of the driver and receivers, voltage of the drivers and receivers, etc. In some example embodiments, if the number of variables in the electrical design is less than eight, the weighted factor is assigned a value of one. If the number of variables is greater or equal to eight, the weighted factor is assigned a value of zero. In some other embodiments, instead of a threshold of eight, the threshold can be other values (e.g., five, ten, twelve, fifteen, twenty, etc.).

In row 210 (C), an electrical design complexity includes a level of variable interactions in the electrical design. In particular, one or more variables can affect one or more other variables in the design. The level of variable interactions can be second order (two-variable interaction), third order (three-variable interaction), fourth order (four-variable interaction), etc. Examples of a second order variable interaction include 1) process and temperature of an electrical component (e.g., the driver); 2) temperature and voltage of an electrical component; 3) length and impedance of a channel, etc. An example of a third order variable interaction includes length of a channel and temperature and process of an electrical component. An example of a fourth order variable interaction includes channel length, channel impedance and process and temperature of an electrical component. Examples of variables that do not interact can include a termination of a receiver and a process of the transmitter within an electrical design. If the level of variable interaction in the electrical design is less than or equal to three, the weighted factor is assigned a value of one. If greater than three, the weighted factor is assigned a value of zero. In other words, if the level of variable interaction is greater than a third order, the weighted factor is assigned a value of zero. Otherwise, the weighted factor is assigned a value of one. In some other embodiments, instead of a threshold of three, the threshold can be other values (e.g., two, four, five, six, etc.).

In row 212 (D), an electrical design complexity includes a time constraint and/or memory restriction of the simulation. For example, a product release date or other deadline can impose a time constraint for how much time can be spent performing the simulation. Also, a computer that is performing the simulation can have limited memory available for the simulation. Such a memory restriction can cause the simulation to perform slower relative to a computer with a larger memory. For example, a single simulation can take excessive time to execute (e.g., several 10s of hours) and can require several 10s of simulations depending on the simulation approach. In another example, for a highly complex circuit, the circuit model can require a large amount of storage space that can require branching out of the main memory during execution, which thereby increases the time of simulation. Therefore, either or both the time constraint and the memory restriction can affect the complexity of the electrical design relative to the simulation. If there is any time constraint or memory restriction, the weighted factor is assigned a value of one. If there is no a time constraint or a memory restriction, the weighted factor is assigned a value one zero. Alternatively, both time constraint and memory restriction are considered together. In particular, if there is both a time constraint and a memory restriction, the weighted factor is assigned a value of one. If no time constraint and no memory restriction, the weighted factor is assigned a value of zero.

In row 214 (E), an electrical design complexity includes whether a statistical analysis or a worst case approach is used in processing and viewing of the simulation results. A statistical analysis of the simulation results assumes that distributions of the parameters are known. The statistical analysis of the simulation results can adjust the variations in the parameters in a random fashion across their defined ranges to analyze the simulation output in terms of the combinations of variances of the parameters. A worst case approach assumes that the worst combination of variations of the parameters in the design space still satisfies the requirements of a specification of the electrical design. If statistical analysis is used, the weighted factor is assigned a value of one. If worst case approach is used, the weighted factor is assigned a value of zero.

FIG. 3 is a choice of simulation approach matrix, according to some example embodiments. A choice of simulation approach matrix 300 incorporates the weighted factors for the electrical design complexity (see FIG. 2) and includes a selected simulation approach based on these weighted factors. In this example, three simulation approaches are selectable. In some other embodiments, more or less simulation approaches can be incorporated into the selection process. For example, as described with referenced to FIG. 1, five different simulation approaches are selectable (approaches 130, 132, 134, 136 and 138). The simulation selection module 172 generates and uses the choice of simulation approach matrix for selection of a simulation approach (as further described below).

The matrix 300 includes columns 302, 304, 306, 308, 310, 312 and 314. Column 302 includes number values for each of the different permutations (32) of the weighted factors for the different electrical design complexities. Column 304 includes values for the weighted factor A—whether the electrical design is known or unknown (see row 206 of FIG. 2). Column 306 includes values for the weighted factor B—the number of variables in the electrical design (see row 208 of FIG. 2). Column 308 includes values for the weighted factor C—level of variable interactions in the electrical design (see row 210 of FIG. 2). Column 310 includes values for weighted factor D—whether there is a time constraint and/or memory restriction for the simulation (see row 212 of FIG. 2). Column 312 includes values for weighted factor E—whether a statistical analysis or a worst case approach is used (see row 214 of FIG. 2). Column 314 includes the selected simulation approach based on the values of the weighted factors. In this example, there are three different simulations approaches: 1) genetic, 2) Monte Carlo, and 3) orthogonal arrays.

In this example, a genetic algorithm simulation is selected for rows 1-13. A Monte Carlo simulation is selected for rows 14-16. An orthogonal arrays simulation is selected for rows 17-32. For example, for row 1, the weighted factors A-E have a value of 0 and a genetic algorithm simulation is selected as the simulation approach. Accordingly, genetic algorithm simulation is selected when 1) the electrical design is unknown—weighted factor A; 2) the number of variables is greater than or equal to 8—weighted factor B; 3) the level of variable interactions in the electrical design is greater than 3—weighted factor C; 4) there are no time constraint and/or memory restriction—weighted factor D; and 5) the worst case approach is selected for the analysis—weighted factor E. For another example, for row 14, the weighted factors A and D have a value of 0; the weighted factors B, C and E have a value of 1; and a Monte Carlo simulation is selected as the simulation approach. Accordingly, Monte Carlo simulation is selected when 1) the electrical design is unknown—weighted factor A; 2) the number of variables is less than 8—weighted factor B; 3) the level of variable interactions in the electrical design is less than or equal to 3—weighted factor C; 4) there are no time constraint and/or memory restriction—weighted factor D; and 5) the statistical analysis approach is selected for the analysis—weighted factor E. For another example, for row 32, the weighted factors A-E have a value of 1 and the orthogonal arrays simulation is selected as the simulation approach. Accordingly, orthogonal arrays simulation is selected when 1) the electrical design is known—weighted factor A; 2) the number of variables is less than 8—weighted factor B; 3) the level of variable interactions in the electrical design is less than or equal to 3—weighted factor C; 4) there are a time constraint and/or a memory restriction—weighted factor D; and 5) the statistical analysis approach is selected for the analysis—weighted factor E.

In this example, each of the factors is equally weighted. In some other embodiments, the weights can be varied. For example, the weighted factors for the number of variables and the level of variable interaction can be assigned a larger value relative to the other weighted factors. Also, a lesser number of weighted factors can be used in the selection of the simulation approach. For example, in some example embodiments, the weighted factors for only the number of variables and the level of variable interaction are used in the selection of the simulation approach. Alternatively, weighted factors for additional electrical design complexities can be used in the selection of a simulation approach.

Figure 4:
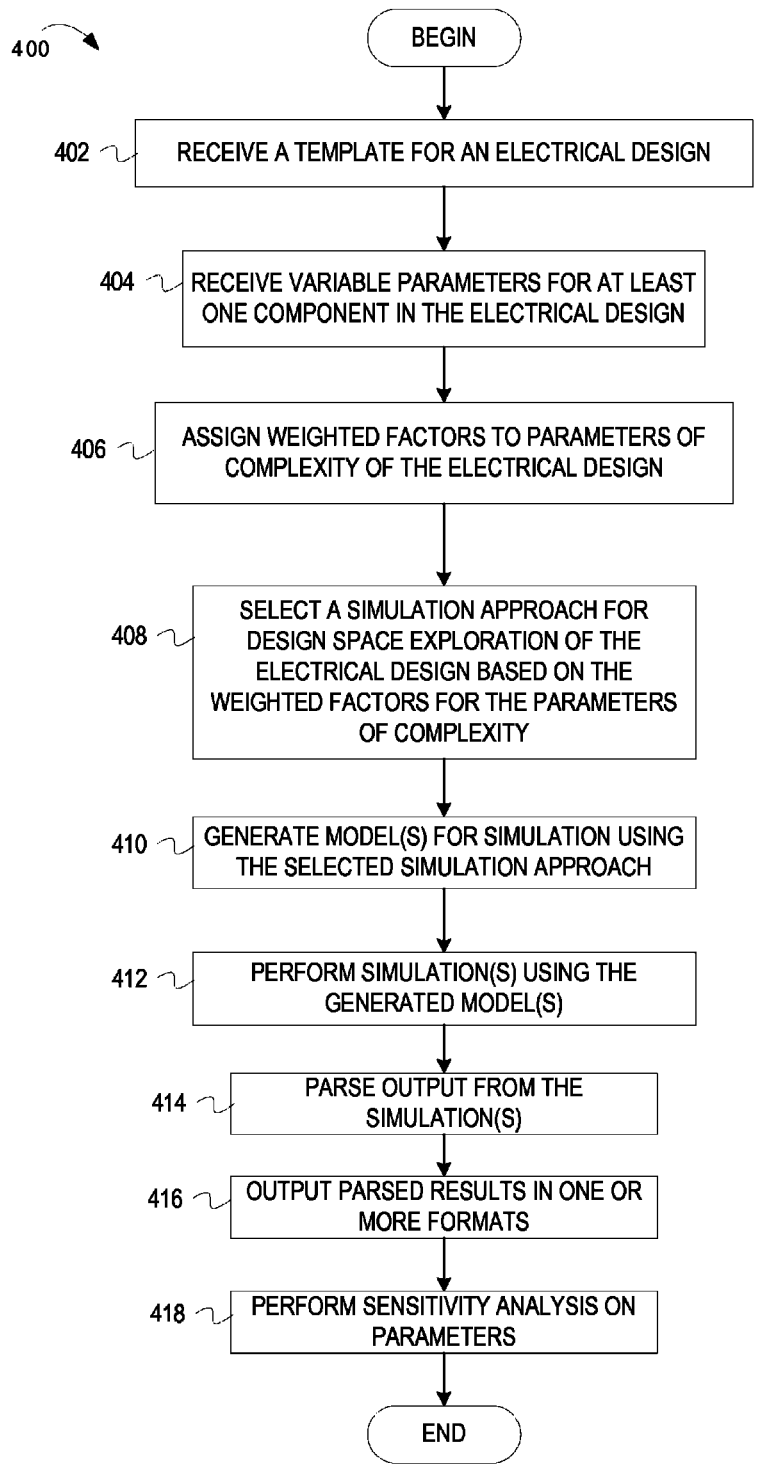
FIG. 4 is a flowchart of operations for electrical design space exploration, according to some example embodiments.

Operations for electrical design space exploration are now described. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram. FIG. 4 is a flowchart of operations for electrical design space exploration, according to some example embodiments. A flow diagram 400 includes operations that, in some example embodiments, are performed by the different modules described in reference to FIG. 1. Therefore, FIG. 4 is described with reference to FIG. 1. The operations of the flow diagram 400 begin at block 402.

At block 402, the simulation selection module 172 receives a template for an electrical design. The template defines the components and the connections there between that are included in the electrical design. An example of the template is illustrated by the electrical design 103. The components for the electrical design 103 included the driver 105, the DIMMs 107, 109 and 111, etc. The electrical design 103 also defines the connections between the driver 105 and the DIMMs 107, 109 and 111. Operations continue at block 404.

At block 404, the simulation selection module 172 receives variable parameters for at least one component in the electrical design ("design component parameters"). With reference to FIG. 1, the simulation selection module 172 receives the design space 129 that has possible values for the parameters of the electrical design 103. For example, the design component parameters include transmission line spacing, driver rise time, driver strength, DIMM resistance and channel lengths between two electrical components. Other design component parameters can include process, temperature and voltage for the driver 105 and the DIMMs 107, 109 and 111, the impedance of the channels connecting two electrical components, etc. Operations continue at block 406.

At block 406, the simulation selection module 172 assigns weighted factors to design complexity parameters of the electrical design. With reference to FIG. 2 as an example, the simulation selection module 172 can assign weighted factors (column 204) to the design complexity parameters of the electrical design (column 202). For example, the simulation selection module 172 can know whether the electrical design is known based on whether prior simulations and analyses have been performed for this particular electrical design. The simulation selection module 172 can query accessible databases of prior simulations and analyses to make this determination. The simulation selection module 172 can determine the number of variables based on input of the design space 129 (that includes the identification of the variables for the electrical design). The simulation selection module 172 can also determine the level of variable interactions based on known or anticipated behavior of such parameters. For example, it may be known that process, temperature and impedance of a same component or components within a defined distance have interactions. The simulation selection module 172 can determine time constraint and memory restriction based on input for an operator for the simulation. Alternatively, this data can be part of the input of the electrical design 103. Similarly, the simulation selection module 172 can determine the type of analysis (statistical or worst case) based on input from a user input or as part of the input of the electrical design 103. Operations continue at block 408.

At block 408, the simulation selection module 172 selects a simulation approach for design space exploration of the electrical design based on the weighted factors for the design complexity parameters. With reference to FIG. 3 as an example, the simulation selection module 172 can receive the matrix 300 that defines the simulation approach based on the weighted factors (as described above). Operations continue at block 410.

At block 410, the simulation selection module 172 generates models for simulation using the selected simulation approach. The simulation selection module 172 can generate the simulation models relative to the selected simulation approach and based on the electrical design 103 and the design space 129 that have been inputted. In particular, the simulation models can be different depending on the selected simulation approach (genetic, orthogonal arrays, Monte Carlo, etc.). Operations continue at block 412.

At block 412, the simulation module 176 performs simulation(s) using the generated model. The simulation module 176 receives the selected simulation approach and the simulation model for the selected simulation approach. The simulation module 176 performs the simulation(s) based on the received simulation model. The simulation module 176 can perform the simulations serially or in parallel. Operations continue at block 414.

At block 414, the output analysis module 178 parses output from the simulation(s). The output analysis module 178 can parse to output selected specific parameters, perform mathematical manipulation, etc. of the simulation output. Operations continue at block 416.

At block 416, the output analysis module 178 outputs parsed results in one or more formats. The output analysis module 178 can output the parsed results into a number of different formats. For example, the formats can include a list of parameters that are in violation of the requirements for the electrical design, a best case for the electrical design, a worst case for the electrical design, etc. Operations continue at block 418.

At block 418, the output analysis module 178 performs a sensitivity analysis on the parameters. The output analysis module 178 can perform a sensitivity analysis to determine which of the parameters is most and least sensitive to variations and the probability of failure due to variation. Operations of the flow diagram 400 are complete.

Embodiments are not limited to the example flowchart depicted in the above figures. Embodiments can perform additional operations, fewer operations, operations in parallel, etc. For instance, referring to FIG. 4, operations for processing the selection of simulation approaches using the weighted factors can be executed in parallel across multiple candidates for the selected simulation approach. Also, at least some of the analyses can be performed in parallel (e.g., best and worst cases, violations, sensitivity analysis, etc.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
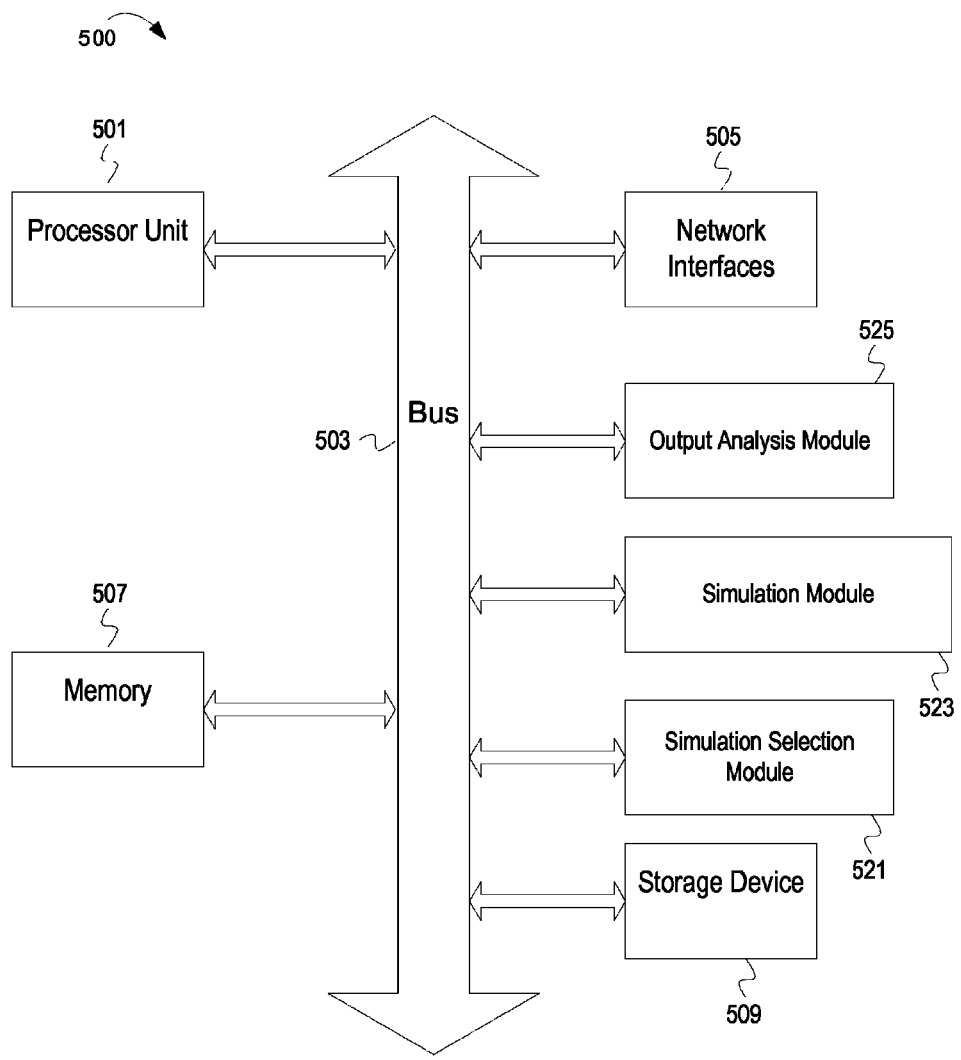
FIG. 5 is a block diagram illustrating a computer system, according to some example embodiments.

FIG. 5 is a block diagram illustrating a computer system, according to some example embodiments. A computer system 500 includes a processor unit 501 (possibly including multiple processors, multiple cores, multiple nodes, and/or implementing multi-threading, etc.). The computer system 500 includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 500 also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system 500 also includes a simulation selection module 521, a simulation module 523 and an output analysis module 525. The simulation selection module 521 can select a simulation approach for simulation of an electrical design based on weighted factors for electrical design complexities. The simulation module 523 can perform simulation(s) based on the selected simulation approach. The output analysis module 525 can analyze the output from the simulation(s). Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for optimizing design space efficiency as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    receiving, by a processor, a template for an electrical design and a plurality of design component parameters that are associated with at least one component in the electrical design;
    assigning weighted factors to design complexity parameters of the electrical design, wherein the design complexity parameters of the electrical design indicate at least two of: whether the electrical design is known, a number of the design component parameters, a level of interaction among the design component parameters, a time constraint and a memory restriction of a simulation, and whether a statistical analysis or a worst case approach will be used to analyze an output of the simulation;
    selecting a first simulation approach for design space exploration of the electrical design from a plurality of simulation approaches based on the weighted factors for the design complexity parameters of the electrical design; and
    performing the simulation of the electrical design defined by the template in accordance with the first simulation approach.

2. The method of claim 1, comprising performing a sensitivity analysis on the design component parameters.

3. The method of claim 1, wherein the plurality of simulation approaches comprises at least two of a swarm intelligence approach, orthogonal array testing approach, a Monte Carlo method approach, design of experiments approach, and a genetic algorithm approach.

4. The method of claim 1, wherein the assigning of the weighted factors to design complexity parameters of the electrical design comprises assigning a weighted factor of the weighted factors to a first of the design complexity parameters based on whether the level of interaction among the design component parameters is greater than a threshold number of the plurality of design component parameters.

5. The method of claim 1, wherein said selecting the first simulation approach for design space exploration of the electrical design from the plurality of simulation approaches based on the weighted factors for the design complexity parameters of the electrical design comprises:
    accessing a structure having a plurality of entries, wherein each of the plurality of entries indicates one of the plurality of simulation approaches and a different combination of weighted factors of the design complexity parameters associated therewith; and
    determining that the first simulation approach is associated with a combination of the weighted factors assigned to the design complexity parameters in a first entry of the plurality of entries of the structure.

6. A computer program product for design space exploration, the computer program product comprising:
    a non-transitory computer readable storage medium having computer readable program code embodied therewith, the computer readable program code comprising:
    computer readable program code configured to,
    receive a template for an electrical design and design component parameters that are associated with at least one component in the electrical design;
    assign weighted factors to parameters of complexity of the electrical design, wherein the parameters of complexity comprise a first parameter of complexity that corresponds to a number of the design component parameters and a second parameter of complexity that corresponds to a level of interaction among the design component parameters;
    select a first simulation approach from a plurality of simulation approaches for design space exploration of the electrical design based on the weighted factors assigned to the parameters of complexity of the electrical design; and
    perform a simulation in accordance with the selected first simulation approach.

7. The computer program product of claim 6, wherein the parameters of complexity of the electrical design further comprise at least one of a third parameter of complexity that corresponds to whether the electrical design is known, a fourth parameter of complexity that corresponds to a time constraint of the simulation, a fifth parameter of complexity that corresponds to a memory restriction of the simulation, and a sixth parameter of complexity that corresponds to whether a statistical analysis or a worst case approach is used to analyze an output of the simulation.

8. The computer program product of claim 6, wherein the computer readable program code is configured to perform a sensitivity analysis on the design component parameters.

9. The computer program product of claim 6, wherein the plurality of simulation approaches comprise at least two of a swarm intelligence approach, orthogonal array testing approach, a Monte Carlo method approach, a design of experiments approach, and a genetic algorithm approach.

10. The computer program product of claim 6, wherein the computer readable program code is configured to assign a weighted factor of the weighted factors to the second parameter of complexity based on whether the level of interaction among the design component parameters is greater than a threshold order of interaction.

11. The computer program product of claim 6, wherein the design component parameters comprise at least one of process of the at least one component in the electrical design, temperature of the at least one component in the electrical design, voltage of the at least one component in the electrical design, length of a channel connecting two components in the electrical design, and impedance of a channel connecting two components in the electrical design.

12. The computer program product of claim 6, wherein the computer readable program code configured to select the first simulation approach from the plurality of simulation approaches for design space exploration of the electrical design based on assignment of the weighted factors to the parameters of complexity of the electrical design comprises computer readable program code configured to:
  access a structure having a plurality of entries, wherein each of the plurality of entries indicates one of the plurality of simulation approaches and a different combination of weighted factors of the parameters of complexity; and
  determine that the first simulation approach is associated with a combination of the weighted factors assigned to the design complexity parameters in a first entry of the plurality of entries of the structure.

13. A computer program product for design space exploration, the computer program product comprising:
  a non-transitory computer readable storage medium having computer readable program code embodied therewith, the computer readable program code comprising:
  computer readable program code configured to,
  receive a template for an electrical design and design component parameters that are associated with at least one component in the electrical design;
  assign weighted factors to parameters of complexity of the electrical design, wherein the parameters of complexity indicate at least two of: whether the electrical design is known, a number of the design component parameters, a level of interaction among the design component parameters, a time constraint and a memory restriction of a simulation, and whether a statistical analysis or a worst case approach will be used to analyze an output of the simulation;
  select a first simulation approach from a plurality of simulation approaches for design space exploration of the electrical design based on the weighted factors for the parameters of complexity of the electrical design; and
  perform the simulation in accordance with the selected first simulation approach.

14. The computer program product of claim 13, wherein the computer readable program code is configured to perform a sensitivity analysis on the design component parameters.

15. The computer program product of claim 13, wherein the plurality of simulation approaches comprises at least two of a swarm intelligence approach, orthogonal array testing approach, a Monte Carlo method approach, design of experiments approach, and a genetic algorithm approach.

16. The computer program product of claim 13, wherein the computer readable program code being configured to assign weighted factors to the parameters of complexity of the electrical design comprises the computer readable program code configured to assign a weighted factor of the weighted factors to a first of the parameters of complexity based on whether the level of interaction among the design component parameters is greater than a threshold number of the plurality of design component parameters.

17. The computer program product of claim 13, wherein the computer readable program code configured to select the first simulation approach from the plurality of simulation approaches for design space exploration of the electrical design based on assignment of the weighted factors to the parameters of complexity of the electrical design comprises computer readable program code configured to:
  access a structure having a plurality of entries, wherein each of the plurality of entries indicates one of the plurality of simulation approaches and a different combination of weighted factors of the parameters of complexity; and
  determine that the first simulation approach is associated with a combination of the weighted factors assigned to the design complexity parameters in a first entry of the plurality of entries of the structure.

18. An apparatus comprising:
  a processor;
  a network interface;
  a simulation selection module operable to,
    receive a template for an electrical design and design component parameters that are associated with at least one component in the electrical design;
    assign weighted factors to parameters of complexity of the electrical design, wherein the parameters of complexity comprise a first parameter of complexity that corresponds to a number of the design component parameters and a second parameter of complexity that corresponds to a level of interaction among the design component parameters; and
    select a first simulation approach from a plurality of simulation approaches for design space exploration of the electrical design based on the weighted factors assigned to the parameters of complexity of the electrical design; and
  a simulation module operable to perform a simulation in accordance with the selected first simulation approach.

19. The apparatus of claim 18, wherein the parameters of complexity of the electrical design further comprise at least one of a third parameter of complexity that corresponds to whether the electrical design is known, a fourth parameter of complexity that correspond to a time constraint of the simulation, a fifth parameter of complexity that corresponds to a memory restriction of the simulation, and a sixth parameter of complexity that corresponds to whether a statistical analysis or a worst case approach will be used to analyze an output of the simulation.

20. The apparatus of claim 18 comprising an output analysis module configured to perform a sensitivity analysis on the design component parameters.

21. The apparatus of claim 18 wherein the plurality of simulation approaches comprise at least two of a swarm intelligence approach, an orthogonal array testing approach, a Monte Carlo method approach, a design of experiments approach, and a genetic algorithm approach.

22. The apparatus of claim 18, wherein the simulation selection module is configured to assign a weighted factor of the weighted factors to the second parameter of complexity based on whether the level of interaction among the design component parameters is greater than a threshold order of interaction.

23. The apparatus of claim 18, wherein the design component parameters comprise at least one of process of the at least one component in the electrical design, temperature of the at least one component in the electrical design, voltage of the at least one component in the electrical design, length of a channel connecting two components in the electrical design, and impedance of a channel connecting two components in the electrical design.

24. The apparatus of claim 18, wherein the simulation selection module being operable to select the first simulation approach from the plurality of simulation approaches for design space exploration of the electrical design based on assignment of the weighted factors to the parameters of complexity of the electrical design comprises the simulation selection module being operable to:
   access a structure having a plurality of entries, wherein each of the plurality of entries indicates one of the plurality of simulation approaches and a different combination of weighted factors of the parameters of complexity; and
   determine that the first simulation approach is associated with a combination of the weighted factors assigned to the design complexity parameters in a first entry of the plurality of entries of the structure.

* * * * *